US008943803B2

(12) United States Patent
Pipis, Jr.

(10) Patent No.: US 8,943,803 B2
(45) Date of Patent: Feb. 3, 2015

(54) POWER SYSTEM WITH CYLINDER-DISABLING STRATEGY (75) Inventor: John S. Pipis, Jr., Washington, IL (US)

(73) Assignee: Caterpillar Inc., Peoria, IL (US)

(*) Notice: Subject to any disclaimer, the term of this patent is extended or adjusted under 35 U.S.C. 154(b) by 726 days.

(21) Appl. No.: 12/913,456

(22) Filed: Oct. 27, 2010

(65) Prior Publication Data

US 2012/0102920 A1 May 3, 2012

(51) Int. Cl.
*F01N 3/00* (2006.01)
*F02D 13/04* (2006.01)
*F01N 3/023* (2006.01)
*F01N 3/10* (2006.01)
*F01N 9/00* (2006.01)
*F02D 17/02* (2006.01)
*F02D 41/02* (2006.01)
*F01N 13/00* (2010.01)
*F01L 13/00* (2006.01)
*F01N 3/20* (2006.01)
*F02D 41/00* (2006.01)

(52) U.S. Cl.
CPC .............. *F02D 13/04* (2013.01); *F01N 3/0231* (2013.01); *F01N 3/103* (2013.01); *F01N 9/002* (2013.01); *F02D 17/02* (2013.01); *F02D 41/025* (2013.01); *F02D 41/029* (2013.01); *F01N 13/009* (2014.06); *F01L 2013/001* (2013.01); *F01N 3/2066* (2013.01); *F02D 41/0087* (2013.01); *F02D 2041/0012* (2013.01); *Y02T 10/26* (2013.01); *Y02T 10/47* (2013.01)
USPC .............................................. 60/285; 60/274

(58) Field of Classification Search
CPC ....... F01N 3/0231; F01N 3/103; F01N 9/002; F02D 17/02; F02D 41/025; F02D 41/029; F02D 13/04; F02D 41/0087; F01L 2013/001

USPC ........................................... 60/285; 123/90.16
See application file for complete search history.

(56) References Cited

U.S. PATENT DOCUMENTS

| | | | |
|---|---|---|---|
| 5,103,779 A * | 4/1992 | Hare, Sr. ..................... | 123/90.11 |
| 7,181,909 B2 | 2/2007 | Sato et al. | |
| 2004/0118107 A1 | 6/2004 | Ament | |
| 2004/0200446 A1* | 10/2004 | Methley ..................... | 123/90.16 |
| 2005/0133003 A1* | 6/2005 | Afjeh et al. ................. | 123/321 |
| 2006/0153761 A1* | 7/2006 | Bandl-Konrad et al. .. | 423/239.1 |

(Continued)

FOREIGN PATENT DOCUMENTS

GB 2435839 9/2007

*Primary Examiner* — Thomas Denion
*Assistant Examiner* — Jason Shanske
(74) *Attorney, Agent, or Firm* — Finnegan, Henderson, Farabow, Garrett & Dunner LLP (57) ABSTRACT

A power system for use with an engine having at least one cylinder, and a piston, a fuel injector, and an exhaust valve associated with the at least one cylinder, is disclosed. The power system may have an exhaust passage, an aftertreatment component disposed within the exhaust passage, and a valve actuator configured to selectively move the exhaust valve. The power system may also have a controller in communication with the fuel injector and the valve actuator. The controller may be configured to make a determination to heat the aftertreatment component, to activate the valve actuator to hold open the exhaust valve as the piston moves through a top-dead-center position to disable the at least one cylinder based on the determination, and to activate the fuel injector to inject fuel into the at least one cylinder while the at least one cylinder is disabled.

20 Claims, 3 Drawing Sheets

(56) References Cited

U.S. PATENT DOCUMENTS

| | | | |
|---|---|---|---|
| 2007/0095312 A1* | 5/2007 | Vanderpoel et al. | 123/90.16 |
| 2007/0245714 A1 | 10/2007 | Frazier et al. | |
| 2007/0277756 A1* | 12/2007 | Hale et al. | 123/90.16 |
| 2008/0083215 A1 | 4/2008 | Yan | |
| 2008/0196388 A1 | 8/2008 | Johnson et al. | |
| 2008/0314021 A1 | 12/2008 | Sisken | |
| 2009/0133387 A1 | 5/2009 | Nishizawa et al. | |
| 2009/0151354 A1 | 6/2009 | Dronzkowski et al. | |
| 2009/0165445 A1 | 7/2009 | Haseyama et al. | |
| 2009/0235645 A1* | 9/2009 | Noda | 60/285 |
| 2009/0301067 A1 | 12/2009 | Dingle et al. | |

\* cited by examiner

POWER SYSTEM WITH CYLINDER-DISABLING STRATEGY

TECHNICAL FIELD

The present disclosure is directed to a power system and, more particularly, to a power system that implements a cylinder-disabling strategy to heat components of the system.

BACKGROUND

Internal combustion engines, including diesel engines, gasoline engines, gaseous fuel-powered engines, and other engines known in the art exhaust a complex mixture of air pollutants. These air pollutants are composed of gaseous compounds such as the oxides of nitrogen (NOx), and unburned solids known as particulate matter. Due to increased awareness of the environment, exhaust emission standards have become more stringent and the amount of NOx and particulate matter emitted from an engine may be regulated depending on the type of engine, size of engine, and/or class of engine.

In order to help ensure compliance with the regulation of NOx, some engine manufacturers have implemented a strategy called Selective Catalytic Reduction (SCR). SCR is a process where gaseous or liquid reductant (most commonly urea) is added to the exhaust gas stream of an engine and is adsorbed onto a downstream catalyst. The reductant reacts with NOx in the exhaust gas to form $H_2O$ and $N_2$, both of which are innocuous substances. Although SCR can be an effective way to reduce NOx, urea and/or sulfur deposits can form within the catalyst during the process, thereby decreasing an effectiveness of SCR. One way of removing these deposits includes periodically heating the exhaust passing through the catalyst above a reaction temperature of the deposits.

The particulate matter in an engine's exhaust is commonly collected with a particulate filter. Over time, the particulate matter builds up in the filter and, if left unchecked, the saturated particulate filter could negatively affect performance of the engine. As such, the particulate matter is periodically removed from the filter through a process called regeneration. To regenerate the particulate filter, the exhaust flowing through the filter is heated above a combustion threshold of the particulate matter, thereby burning away the collected matter.

One way to periodically heat an engine's exhaust is disclosed in US Patent Publication No. 2008/1096388 (the '388 publication) of Johnson et al. that published on Aug. 21, 2008. Specifically, the '388 publication discloses using an engine brake on at least one cylinder to increase exhaust temperatures to a level sufficient to achieve the regeneration temperature of a diesel particulate filter. During the engine braking described in the '388 publication, fuel is no longer supplied to the braking cylinder. At the same time, an exhaust valve in the braking cylinder is opened just prior to the piston reaching the top-dead-center position to relieve pressures within the cylinder and thereby increase a load on the engine. The increased engine load caused by the braking cylinder results in extra fueling of non-braking cylinders. This extra fueling increases a temperature of exhaust exiting the non-braking cylinders to the required activation temperature of the particulate trap.

SUMMARY

One aspect of the present disclosure is directed to a power system for use with an engine having at least one cylinder, a piston disposed within the at least one cylinder, and a fuel injector and an exhaust valve associated with the at least one cylinder. The power system may include an exhaust passage connected to the engine and configured to direct exhaust from the at least one cylinder to the atmosphere, an aftertreatment component disposed within the exhaust passage and configured to treat exhaust flowing through the exhaust passage, and a valve actuator configured to selectively move the exhaust valve. The power system may also include a controller in communication with the fuel injector and the valve actuator. The controller may be configured to make a determination to heat the aftertreatment component, to activate the valve actuator to hold open the exhaust valve as the piston moves through a top-dead-center position to disable the at least one cylinder based on the determination, and to activate the fuel injector to inject fuel into the at least one cylinder while the at least one cylinder is disabled.

Another aspect of the present disclosure is directed to a power system for use with an engine having at least one cylinder, a piston disposed within the at least one cylinder, and a fuel injector and an exhaust valve associated with the at least one cylinder. The power system may include an exhaust passage connected to the engine and configured to direct exhaust from the at least one cylinder to the atmosphere, an aftertreatment component disposed within the exhaust passage and configured to treat exhaust flowing through the exhaust passage, and a valve actuator configured to selectively move the exhaust valve. The power system may also include a controller in communication with the fuel injector and the valve actuator. The controller may be configured to make a determination to heat the aftertreatment component, to activate the valve actuator to open the exhaust valve and disable the at least one cylinder, and to activate the fuel injector to inject fuel into the at least one cylinder while the exhaust valve is open.

Yet another aspect of the present disclosure is directed to another power system for an engine having at least one cylinder, a piston disposed within the at least one cylinder, and a fuel injector and an exhaust valve associated with the at least one cylinder. The power system may include an exhaust passage connected to the engine and configured to direct exhaust from the at least one cylinder to the atmosphere, and a catalyst substrate disposed within the exhaust passage and configured to reduce a constituent of exhaust flowing through the exhaust passage. The power system may also include a valve actuator configured to selectively move the exhaust valve, and a controller in communication with the fuel injector and the valve actuator. The controller may be configured to make a determination to heat the catalyst substrate and remove deposits, and to activate the valve actuator to hold open the exhaust valve as the piston moves through a top-dead-center position to disable the at least one cylinder based on the determination. The controller may also be configured to activate the fuel injector to inject fuel into the at least one cylinder while the at least one cylinder is disabled and while the exhaust valve is held open.

Another aspect of the present disclosure is directed to a method of treating exhaust from an engine. The method may include combusting a mixture of fuel and air to generate a mechanical output and a flow of exhaust, and directing exhaust through an aftertreatment component. The method may further include making a determination to heat the aftertreatment component, selectively relieving a pressure within an engine cylinder as a piston in the cylinder moves through a top-dead-center position to inhibit the combusting based on the determination, and selectively injecting fuel while cylinder pressure is being relieved.

DETAILED DESCRIPTION

Figure 1:
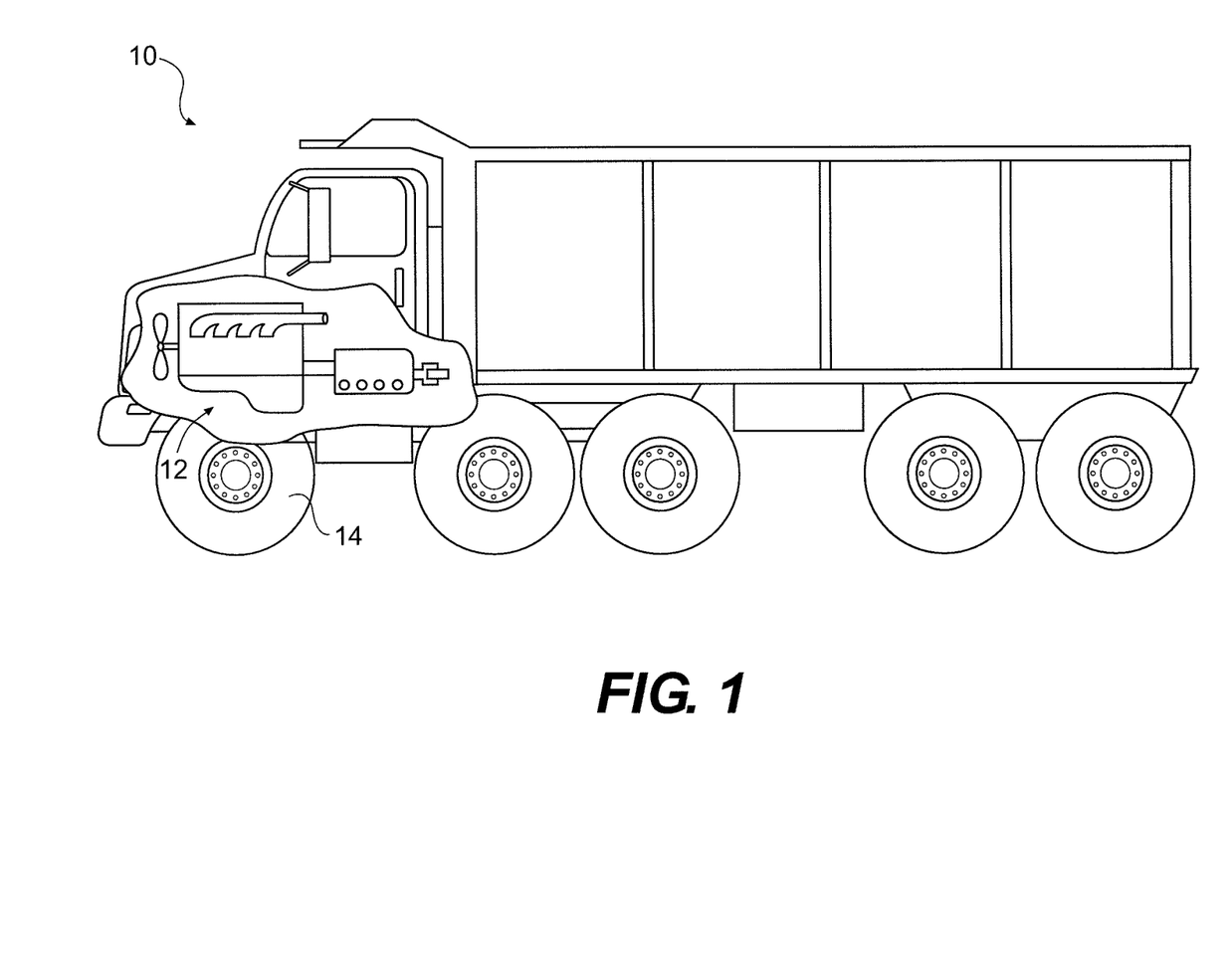
FIG. 1 is a diagrammatic illustration of an exemplary disclosed machine.

FIG. 1 illustrates an exemplary machine 10. Machine 10 may be a mobile machine that performs some type of operation associated with an industry, such as mining, construction, farming, transportation, or any other industry known in the art. For example, machine 10 may be an earth moving machine such as an on- or off-highway haul truck, a loader, or a motor grader. Machine 10 may include an engine system 12 operable to generate a mechanical output that drives one or more traction devices 14 to propel machine 10.

Figure 2:
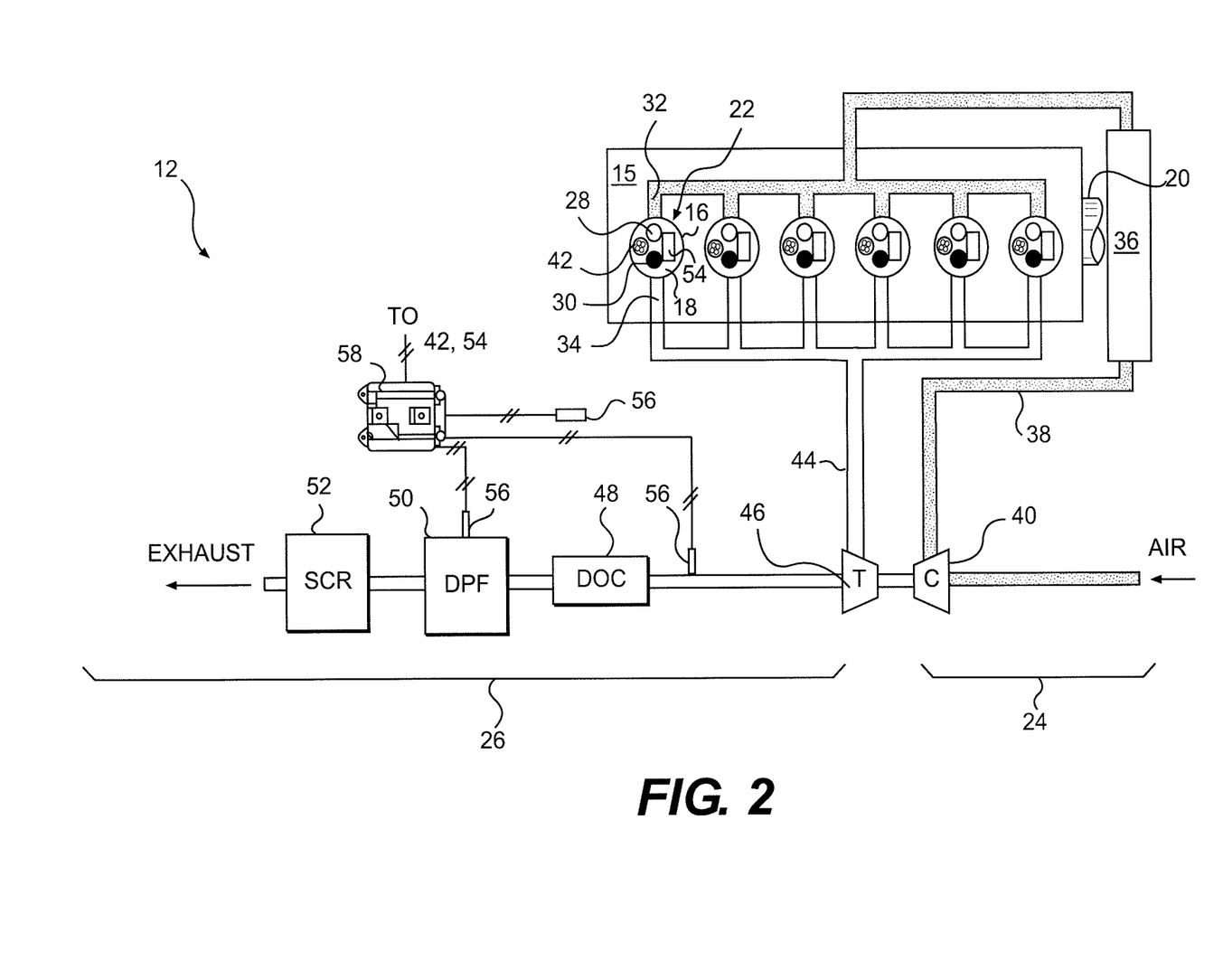
FIG. 2 is a diagrammatic illustration of an engine system that may be used with the machine of FIG. 1.

For the purposes of this disclosure, engine system 12 is depicted and described as a diesel-fueled, internal combustion engine. However, it is contemplated that engine system 12 may embody any other type of internal combustion engine, such as, for example, a gasoline or gaseous fuel-powered engine. As shown in FIG. 2, engine system 12 may include an engine block 15 that at least partially defines one or more cylinders 16, and a piston 18 disposed within each cylinder 16. It is contemplated that engine system 12 may include any number of cylinders 16 and that cylinders 16 may be disposed in an "in-line" configuration, a "V" configuration, or in any other conventional configuration.

Each piston 18 may be configured to reciprocate between a bottom-dead-center (BDC) or lower-most position within cylinder 16, and a top-dead-center (TDC) or upper-most position within cylinder 16. In particular, piston 18 may be pivotally coupled to a crankshaft 20 by way of a connecting rod (not shown). Crankshaft 20 of engine system 12 may be rotatably disposed within engine block 15 and each piston 18 coupled to crankshaft 20 such that a sliding motion of each piston 18 within each cylinder 16 results in a rotation of crankshaft 20. Similarly, a rotation of crankshaft 20 may result in a sliding motion of piston 18. As crankshaft 20 rotates through about 180 degrees, piston 18 may move through one full stroke between BDC and TDC. In one embodiment, engine system 12 may be a four-stroke engine, wherein a complete cycle includes an intake stroke (TDC to BDC), a compression stroke (BDC to TDC), a power stroke (TDC to BDC), and an exhaust stroke (BDC to TDC). It is contemplated, however, that engine system 12 may alternatively embody a two-stroke engine, if desired, wherein a complete cycle includes a compression/exhaust stroke (BDC to TDC) and a power/exhaust/intake stroke (TDC to BDC). Accordingly, the reciprocating motion of piston 18 during particular strokes may be defined in terms of angles of crankshaft rotation relative to the TDC and BDC positions, for example in terms of a number of angles before TDC (BTDC), before BDC (BBDC), after TDC (ATDC), and after BDC (ABDC), as will be described in more detail below.

Engine system 12 may include multiple different subsystems that cooperate to facilitate combustion within cylinders 16. The subsystems of engine system 12 may include, among others, a valve actuation system 22, an air induction system 24, and a power system 26. Valve actuation system 22 may be configured to regulate fluid flows into and out of engine system 12. Air induction system 24 may be configured to supply charge air or a mixture of fuel and air to engine system 12. Power system 26 may be configured to treat and discharge exhaust from engine system 12 to the atmosphere.

Valve actuation system 22 may include a plurality of gas exchange valves associated with each cylinder 16 and configured to meter air into and exhaust out of cylinder 16. Specifically, valve actuation system 22 may include at least one intake valve 28 and at least one exhaust valve 30, although any number of valves may be associated with each cylinder 16. Intake valve 28 may be configured to normally allow fluid flow through a respective intake port 32 during a portion of the intake and/or compression strokes of piston 18 to allow air or an air and fuel mixture to enter each respective cylinder 16. Exhaust valve 30 may be configured to normally allow fluid flow through a respective exhaust port 34 during a portion of the power and/or exhaust strokes of piston 18 to allow exhaust to exit each respective cylinder 16. Each of intake and exhaust valves 28, 30 may be actuated to move or "lift" and thereby open the respective port 32, 34. In a cylinder 16 having a pair of intake valves 28 and a pair of exhaust valves 30, each pairing may be actuated together by a single valve actuator (not shown) or independently by separate valve actuators (not shown), as desired.

Each of intake and exhaust valves 28, 30 may be normally operated in any conventional way to move from the closed or flow-blocking position to the open or flow-passing position in a cyclical manner. For example, intake and exhaust valves 28, 30 may be normally lifted by way of an engine cam (not shown) that is rotatingly driven by crankshaft 20, by way of a hydraulic actuator (not shown), by way of an electronic actuator (not shown), or in any other manner. During normal operation of engine system 12, intake and exhaust valves 28, 30 may be lifted in a predefined cycle related to the motion of the associated piston 18 and rotation of crankshaft 20.

Air induction system 24 may include components that condition and introduce compressed air into cylinders 16 by way of intake ports 32 and intake valves 30. For example, air induction system 24 may include an air cooler 36 disposed within an inlet passage 38 and located downstream of one or more compressors 40. Compressors 40 may be connected to pressurize combustion air chilled by cooler 36 and directed through inlet passage 38 to inlet ports 32. In this manner, a density of the air may be increased and a greater quantity of compressed air forced into cylinders 16. It is contemplated that air induction system 24 may include different or additional components than described above, if desired, such as, filtering components, compressor bypass components, thermostat devices associated selective control of air cooler 36, and other known components.

Fuel may be mixed with the charged air from compressor 40 before and/or after the air enters cylinders 16. In one example, engine system 12 may include at least one fuel injector 42 associated with each cylinder 16 and configured to inject fuel into the associated cylinder 16. Each fuel injector 42 may embody, for example, an electronically actuated-electronically controlled unit injector, a mechanically actuated-electronically controlled injector, a digitally controlled fuel valve, or any other type of fuel injector known in the art. Each fuel injector 42 may be separately and independently operable to inject an amount of pressurized fuel into an associated cylinder 16 at predetermined timings relative to the motion of piston 18, fuel pressures, and fuel flow rates. In another example, one or more injectors (not shown) may alternatively be associated with inlet passage 38 and/or with multiple inlet ports 32, if desired.

Power system 26 may include components that condition and direct exhaust from cylinders 16 to the atmosphere. For example, power system 26 may include an exhaust passage 44, one or more turbines 46 driven by exhaust in passage 44, a plurality of exhaust treatment components disposed in series and fluidly connected downstream of turbine 46, and control components configured to regulate the flow of exhaust through the exhaust treatment components to the atmosphere. It is contemplated that exhaust system 26 may include different or additional components than described above, if desired, such as bypass components, exhaust gas recirculation components, attenuation devices, and other known components.

Turbine 46 may be located in exhaust passage 44 to receive exhaust discharged from exhaust ports 34. Turbine 46 may be connected to one or more compressors 40 of air induction system 24 by way of a common shaft to form a turbocharger. As the hot exhaust gases exiting engine system 12 move through turbine 46 and expand against vanes (not shown) thereof, turbine 46 may rotate and drive the connected compressor 40 to pressurize inlet air.

The exhaust treatment components of power system 26 may include, among others, an oxidation catalyst 48, a particulate filter 50, and a selective catalytic reduction (SCR) device 52 disposed downstream of turbine 46. Oxidation catalyst 48 may cooperate with particulate filter 50 and SCR device 52 to condition the exhaust flow from engine system 12. In particular, oxidation catalyst 48 may include a substrate catalyzed with a precious metal that catalyzes a reaction to convert a portion of the NO found in the exhaust flow of engine system 12 to $NO_2$, which may be more susceptible to conditioning within SCR device 52. The additional $NO_2$ from oxidation catalyst 48 may also facilitate an exothermic reaction of excess fuel in the exhaust flow thereby heating the exhaust flow and downstream components. The exhaust flow may be heated to a level sufficient to regenerate particulate filter 50 and/or to remove urea and sulfur buildup from SCR device 52.

Particulate filter 50 may receive exhaust from oxidation catalyst 48 and be configured to collect and trap particulate matter entrained within the exhaust. In one embodiment, particulate filter 50 may include a porous wire mesh or ceramic honeycomb filtration media that blocks particulate matter of a minimum size. Over time, the particulate matter may build up within particulate filter 50 and the filtration media may become saturated. If unaccounted for, this buildup of matter could reduce exhaust flow through the filtration media and subsequent engine performance. Accordingly, particulate filter 50 may need to be selectively regenerated to reduce the buildup of particulate matter. The need to regenerate particulate filter 50 may be determined based on an elapsed period of operational time, a pressure drop across particulate filter 50, a temperature of particulate filter 50, an amount of fuel consumed by engine system 12, or another similar parameter.

SCR device 52 may include a catalyst substrate (not shown) and a reductant injector (not shown) located upstream of the substrate. The reductant injector may spray or otherwise advance a gaseous or liquid reductant, most commonly urea $((NH_2)_2CO)$, into the exhaust of engine system 12 for adsorption onto a surface of the substrate. The reductant may react with NOx (NO and $NO_2$ from oxidation catalyst 48) in the exhaust gas to form water ($H_2O$) and elemental nitrogen ($N_2$).

The control components may include, among others, a variable valve actuator (VVA) 54, one or more sensors 56, and a controller 58 in communication with fuel injectors 42, VVA 54, and sensors 56. VVA may be configured to selectively interrupt the normal cyclical movements of intake and/or exhaust valves 28, 30 based on a command from controller 58. Sensors 56 may be configured to detect operational parameters of engine system 12 and generate signals indicative of those parameters directed to controller 58. Controller 58 may be configured to selectively regulate operation of fuel injectors 42 and VVA 54 to heat components of power system 26 based on input from sensors 56, as will be described in more detail below.

VVA 54 may be selectively activated by controller 58 to open, hold open, close, and/or hold close one or both of intake and exhaust valves 28, 30 to implement a mode of operation that varies an amount of unburned fuel passing from engine system 12 into aftertreatment 26 and thereby a temperature of power system 26. For example, VVA 54 may be activated to vary an opening timing of exhaust valve 30 during a compression stroke of piston 18 and/or a closing timing of exhaust valve 30 during a subsequent power stroke to implement a cylinder-disabling mode of operation. During this mode of operation, unburned fuel may be directed from engine system 12 through exhaust ports 34 and into oxidation catalyst 48 for subsequent combustion in the presence of $NO_2$ generated by oxidation catalyst 48. In this example, VVA 54 may be activated to open exhaust valve 30 at about 60-20° of crankshaft rotation before piston 18 reaches the TDC position (i.e., about 60-20° BTDC). VVA 54 may also be configured to hold exhaust valve 30 open while piston 18 moves through the TDC position and into the power stroke, until the time when exhaust valve 30 would normally be opened as part of the four stroke cycle (e.g., at about 20° BBDC during the power stroke). VVA 54 may embody any device that is directly or indirectly coupled to intake and/or exhaust valves 28, 30 to selectively move the corresponding valve to and/or hold the valve in a flow passing position for an extended period of time.

By opening a gas exchange valve (e.g., exhaust valve 30) during the compression and/or power strokes, cylinder 16 may be disabled. Specifically, in order for a mixture of air and fuel within cylinder 16 to combust, a minimum level of pressure is required. When a gas exchange valve is opened during the compression and/or power strokes, some of the air within cylinder 16 at that time may be pushed out of cylinder 16 thereby lowering the internal pressure below the minimum level. In this manner, VVA 54 may be activated by controller 58 to disable cylinder 16. By opening exhaust valve 30 during the compression and/or power strokes, any air and fuel within cylinder 16 may be pushed out by piston 18 and directed into power system 26.

In addition to being used to pass unburned fuel from a disabled cylinder 16 into power system 26, it is contemplated that VVA 54 may also be utilized as a conventional engine brake. That is, based on operator input (e.g., operator manipulation of a brake pedal or switch), controller 58 may selectively activate VVA 54 to cause exhaust valve 30 to open during portions of the compression and/or power strokes to relieve pressures within cylinder 16. By relieving the pressures within cylinder 16, a load on engine system 12 may be increased, thereby slowing the speed of engine system 12. The engine braking routine may be a predefined routine stored in a memory of controller 58 that is implemented each time the operator input is received and/or for a period of time during which the input is received. It is contemplated that controller 58 may implement the same routine (i.e., valve opening/closing times and lift amounts) during engine braking and exhaust heating, if desired, with the primary differences including cylinder fueling and routine triggers. That is, during typical engine braking, there may be little, if any, unburned fuel within cylinder 16 that passes to power system 26 and, as described above, engine braking may be based on operator input rather than a need to heat power system 26.

Controller 58 may be configured to activate fuel injector 42 and inject fuel into cylinder 16 while cylinder 16 is disabled to implement the aftertreatment heating routine. By injecting fuel into cylinder 16 while cylinder 16 is disabled, the fuel may be passed through cylinder 16 and into power system 26 substantially unburned. This unburned fuel may then ignite in or near oxidation catalyst 48, in the presence of $NO_2$ generated by oxidation catalyst 48, and be used to heat particulate filter 50, SCR device 52, and/or other exhaust treatment components. In the disclosed embodiment, fuel injection may occur while exhaust valve 30 is held open by VVA 54 (i.e., between about 60-20° BTDC during the compression stroke and about 20° BBDC during the power stroke). By injecting fuel while exhaust valve 30 is held open, the injected fuel may dwell for a shorter period of time within cylinder 16 and thereby increase an amount of the injected fuel that actually enters power system 26. That is, by injecting fuel while exhaust valve 30 is held open, an amount of fuel that deposits on surfaces of cylinder 16 and piston 18 and/or passes therebetween into a crankcase of engine system 12, may be reduced. It is contemplated that the injection of fuel that occurs while cylinder 16 is disabled for the purpose of heating power system 26 may correspond with the cyclical injection that normally occurs when cylinder 16 is fully operational or, alternatively, that this injection of fuel may be an additional or substitute injection, if desired.

Sensors 56 may embody any kind of sensor used by controller 58 in the regulation of fuel injector 42 and/or VVA 54. Sensors 56 may include, for example, one or more temperature sensors, pressure sensors, velocity sensors, flow sensors, constituent sensors, or other types of sensors associated with exhaust passage 44, oxidation catalyst 48, particulate filter 50, SCR device 52, and/or engine system 12. Sensors 56 may generate signals indicative of performance and/or operation of power system 26 and/or engine system 12, and direct these signals to controller 58. Based on the signals from sensor 56, controller 58 may make a determination to disable cylinder 16 and inject fuel into cylinder 16, thereby heating the components of power system 26. The determination may be based on, for example, a need or desire to regenerate particulate filter 50 and/or a need to remove urea or sulfur buildup from SCR device 52.

It is contemplated that sensors 56 may embody virtual sensors rather than physical sensors, if desired. A virtual sensor may be a model-driven estimate based on one or more known or sensed operational parameters of engine system 12 and/or power system 26. For example, based on a known operating speed, load, inlet temperature, boost pressure, and/or other parameter of engine system 12, a model may be referenced to determine a constituent concentration, particulate filter load, or exhaust temperature. As a result, the signal directed from sensors 56 to controller 58 may be based on calculated or estimated values rather than direct measurements, if desired Controller 58 may embody a single microprocessor or multiple microprocessors that include a means for controlling an operation of power system 26 in response to signals received from sensors 56. Numerous commercially available microprocessors can be configured to perform the functions of controller 58. It should be appreciated that controller 58 could readily embody a general engine system microprocessor capable of controlling numerous engine system functions and modes of operation. Various other known circuits may be associated with controller 58, including power supply circuitry, signal-conditioning circuitry, solenoid driver circuitry, communication circuitry, and other appropriate circuitry.

Figure 3:
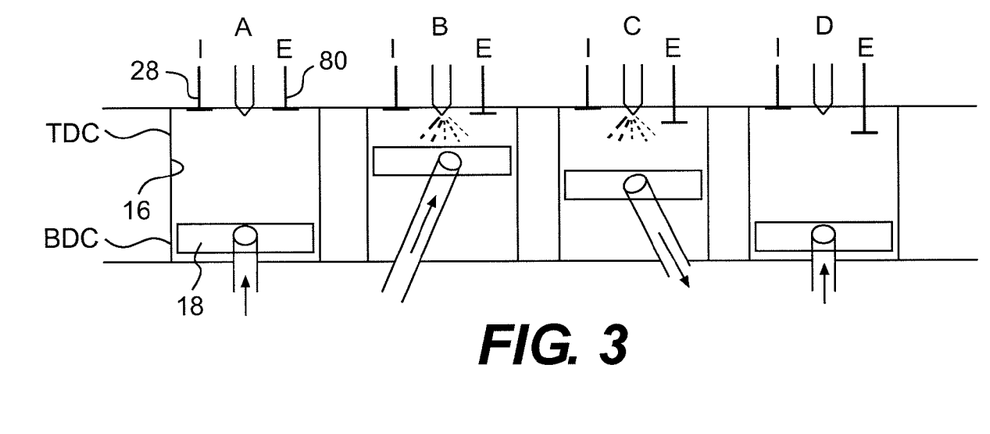
FIG. 3 is a diagrammatic illustration of a portion of the engine system of FIG. 2 shown in consecutive operating positions A-D.
Figure 4:
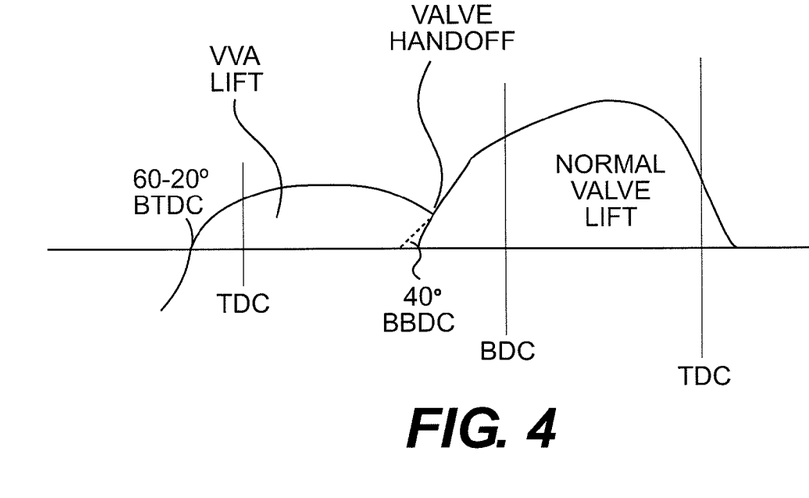
FIG. 4 is a graph showing lift of an exhaust valve associated with the engine system of FIG. 2.

FIGS. 3 and 4 illustrate operation of engine system 12 and power system 26. FIGS. 3 and 4 will be discussed in more detail in the following section to further illustrate the disclosed system and its operation.

INDUSTRIAL APPLICABILITY

The power system of the present disclosure may be used in any engine system application where performance of the engine system is enhanced by a selectively elevated exhaust temperature. Although capable of functioning in conjunction with a range of treatment devices, the disclosed power system may be primarily beneficial when associated with a particulate filter or SCR device. The selectively heated exhaust may be used to regenerate the particulate filter and/or remove deposits from the SCR device. The disclosed system provides the elevated exhaust temperature by selectively passing unburned fuel from a disabled cylinder of the engine system to the aftertreatment device. Operation of power system 26 will now be explained.

Referring to FIG. 2, air may be pressurized by compressor 40 and forced into cylinders 16 of engine system 12 for subsequent combustion. Fuel may be injected by fuel injectors 42 into cylinders 16, mixed with the pressurized air therein, and combusted by engine system 12 to produce a mechanical work output and an exhaust flow of hot gases. The exhaust flow may contain a complex mixture of air pollutants, which can include particulate matter and oxides of nitrogen (NOx). As this exhaust flow is directed from cylinders 16 through oxidation catalyst 48, some NO in the exhaust may be converted to $NO_2$. This exhaust mixture may then be directed through particulate filter 50, where particulate matter entrained in the exhaust flow becomes trapped. The exhaust flow, now substantially free of particulate matter, may pass to SCR device 52, where NOx may be converted to $N_2$ and $H_2O$.

Over time, the particulate matter may build up within particulate filter 50 and deposits of urea and/or sulfur may form within SCR device 52. In order to regenerate particulate filter 50 and/or to remove the deposits from SCR device 52, a temperature of the exhaust passing through these components should be temporarily elevated. Controller 58 may selectively disable one or more cylinders 16 of engine system 12 via VVA 54 and simultaneously activate fuel injector 42 to inject fuel into the disabled cylinder(s) 16. The disabled state of cylinder 16 may preclude combustion of the injected fuel, instead allowing the fuel to be pumped out of cylinder 16 into power system 26. The unburned fuel, in the presence of $NO_2$ generated by oxidation catalyst 48, may combust and heat the exhaust passing through particulate filter 50 and/or SCR device 52 to a desired level. It is contemplated that disabling of cylinder 16 via VVA 54 may be achieved through implementation of a conventional braking routine or, alternatively, through a specialized aftertreatment heating routine, as desired.

As shown in operating position A of FIG. 3, as piston 18 begins an upward-moving compression stroke, both intake and exhaust valves 28, 30 may initially be in the closed or flow-blocking position. In this state, the upward movement of piston 18 may begin to cause an increase in pressure within cylinder 16. If allowed to continue, this building pressure could be become great enough to initiate combustion of any injected fuel. However, as shown in operating position B of FIG. 3, when controller 58 makes a determination to elevate the exhaust temperatures in preparation for a particulate filter regeneration event or a SCR deposit removing event, controller 58 may activate VVA 54 (referring to FIG. 2) to open exhaust valve 30 at about 60-20° BTDC and thereby disable cylinder 16.

When exhaust valve 30 opens during the compression stroke of piston 18, air from within cylinder 16 may be pushed by the movement of piston 18 through exhaust port 34 into power system 26. This flow of air out of cylinder 16 may relieve cylinder pressures, thereby reducing the likelihood of combustion. As shown in operating positions C and D of FIG. 3, exhaust valve 30 may be held in the open or flow-passing position until after piston 18 moves through TDC and begins its downward-moving power stroke. In one embodiment, exhaust valve 30 may be held open until about 40° BBDC of the power stroke, when exhaust valve 30 is normally lifted through its cyclical motion (referring to operating position D). The handoff between VVA 54 (referring to FIG. 2) and the engine cam or other conventional actuator (not shown) of engine system 12 may be best seen in the step about midway through the valve lift curve of FIG. 4. During the movement of piston 18 in the compression stroke and before piston 18 reaches TDC, controller 58 may activate fuel injector 42 to begin injecting fuel (referring to operating position B). In one embodiment, the injection of fuel may continue until some point after TDC (referring to operating position C). That is, the injection of fuel may be performed entirely while exhaust valve 30 is held in the flow-passing position.

Several advantages may be associated with the currently disclosed power system. In particular, because fuel injector 42 may inject fuel while exhaust valve 30 is open, the injected fuel may remain within cylinder 16 for only a very short period of time. That is, the injected fuel may immediately be pushed out of cylinder 16 with the exiting air, thereby reducing a likelihood of walls of cylinder 16 being wetted by the injected fuel or of fuel penetrating a crankcase of engine system 12. In addition, because exhaust valve 30 may selectively open at about 20-60° BTDC and remain open as piston 18 passes through TDC until about 40° BBDC, the peak pressure reached within cylinder 16 may be low and a greater amount of air and fuel may be pushed from cylinder 16 into power system 26. The greater amount of air and fuel entering power system 26 may help to increase the exhaust temperatures therein in an efficient manner.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A power system for an engine having at least one cylinder, a piston disposed within the at least one cylinder, and a fuel injector and an exhaust valve associated with the at least one cylinder, the power system comprising:
   an exhaust passage connected to the engine and configured to direct exhaust from the at least one cylinder to the atmosphere;
   an aftertreatment component disposed within the exhaust passage and configured to treat exhaust flowing through the exhaust passage;
   a valve actuator configured to selectively move the exhaust valve; and
   a controller in communication with the fuel injector and the valve actuator, the controller configured to:
      make a determination to heat the aftertreatment component;
      activate the valve actuator to hold open the exhaust valve as the piston moves through a top-dead-center position and into a power stroke to disable the at least one cylinder based on the determination; and
      activate the fuel injector to inject fuel into the at least one cylinder while the at least one cylinder is disabled by the opening of the exhaust valve for a duration extending through the top-dead-center position in which the exhaust valve is held open.

2. The power system of claim 1, wherein the aftertreatment component is a particulate filter.

3. The power system of claim 2, further including an oxidation catalyst disposed within the exhaust passage upstream of the particulate filter, wherein fuel injected while the at least one cylinder is disabled passes into the exhaust passage and burns in the oxidation catalyst.

4. The power system of claim 3, wherein the valve actuator is configured to open the exhaust valve during compression and power strokes of the piston to slow the engine during an engine braking routine.

5. The power system of claim 4, wherein the controller is configured to implement the engine braking routine while activating the at least one injector to regenerate the particulate filter.

6. The power system of claim 1, wherein the controller is configured to activate the valve actuator and open the exhaust valve at about 60-20 degrees before-top-dead-center of the piston.

7. The power system of claim 6, wherein the controller is configured to activate the valve actuator and hold open the exhaust valve until the exhaust valve is lifted by an engine cam during a following piston stroke.

8. The power system of claim 7, wherein the engine cam lifts the exhaust valve at about 40 degrees before-bottom-dead-center of the piston during the following piston stroke.

9. A power system for an engine having at least one cylinder, a piston disposed within the at least one cylinder, and a fuel injector and an exhaust valve associated with the at least one cylinder, the power system comprising:
   an exhaust passage connected to the engine and configured to direct exhaust from the at least one cylinder to the atmosphere;
   an aftertreatment component disposed within the exhaust passage and configured to treat exhaust flowing through the exhaust passage;
   a valve actuator configured to selectively move the exhaust valve; and
   a controller in communication with the fuel injector and the valve actuator, the controller configured to:
      make a determination to heat the aftertreatment component;
      activate the valve actuator to hold open the exhaust valve as the piston moves through a top-dead-center position and into a power stroke, and disable the at least one cylinder; and
      activate the fuel injector to inject fuel into the at least one cylinder while the exhaust valve is held open for a duration extending through the top-dead-center position in which the exhaust valve is held open.

10. The power system of claim 9, wherein the aftertreatment component is a particulate filter.

11. The power system of claim 10, further including an oxidation catalyst disposed within the exhaust passage upstream of the particulate filter, wherein fuel injected while the at least one cylinder is disabled passes into the exhaust passage and burns in the oxidation catalyst.

12. The power system of claim 11, wherein the valve actuator is configured to open the exhaust valve during compression and power strokes of the piston to slow the engine during an engine braking routine.

13. The power system of claim 12, wherein the controller is configured to implement the engine braking routine while activating the at least one injector to regenerate the particulate filter.

14. The power system of claim 9, wherein the controller is configured to activate the valve actuator and open the exhaust valve at about 60-20 degrees before-top-dead-center of the piston.

15. The power system of claim 14, wherein the controller is configured to activate the valve actuator and hold open the exhaust valve until the exhaust valve is lifted by an engine cam during a following piston stroke.

16. The power system of claim 15, wherein the engine cam lifts the exhaust valve at about 40 degrees before-bottom-dead-center of the piston during the following piston stroke.

17. A power system for an engine having at least one cylinder, a piston disposed within the at least one cylinder, and a fuel injector and an exhaust valve associated with the at least one cylinder, the power system comprising:
  an exhaust passage connected to the engine and configured to direct exhaust from the at least one cylinder to the atmosphere;
  a catalyst substrate disposed within the exhaust passage and configured to reduce a constituent of exhaust flowing through the exhaust passage;
  a valve actuator configured to selectively move the exhaust valve; and
  a controller in communication with the fuel injector and the valve actuator, the controller configured to:
    make a determination to heat the catalyst substrate and remove deposits;
    activate the valve actuator to hold open the exhaust valve as the piston moves through a top-dead-center position and into a power stroke to disable the at least one cylinder based on the determination; and
    activate the fuel injector to inject fuel into the at least one cylinder while the at least one cylinder is disabled and while the exhaust valve is held open for a duration extending through the top-dead-center position in which the exhaust valve is held open.

18. A method of treating exhaust from an engine, comprising:
  combusting a mixture of fuel and air to generate a mechanical output and a flow of exhaust;
  directing exhaust through an aftertreatment component;
  making a determination to heat the aftertreatment component;
  selectively relieving a pressure within an engine cylinder as a piston in the engine cylinder moves through a top-dead-center position and into a power stroke to inhibit the combusting based on the determination; and
  selectively injecting fuel while cylinder pressure is being relieved,
  wherein selectively injecting fuel includes injecting fuel into the engine cylinder for a duration extending through the top-dead-center position in which an exhaust valve is held open.

19. The method of claim 18, wherein selectively relieving includes selectively relieving starting at about 60-20 degrees before-top-dead-center of the piston.

20. The method of claim 19, wherein selectively relieving includes returning engine cylinder operation to normal at about 40 degrees before-bottom-dead-center of the piston during a following stroke.

* * * * *